United States Patent [19]

Fujimoto et al.

[11] 4,186,024
[45] Jan. 29, 1980

[54] METHOD FOR IMPROVING WATER-RESISTANCE OF PULLULAN

[75] Inventors: Masanori Fujimoto, Ibaraki; Kosuke Fukami, Settsu; Kozo Tsuji; Tsuneyuki Nagase, both of Takatsuki, all of Japan

[73] Assignees: Sumitomo Chemical Company, Limited, Osaka; Hayashibara Biochemical Laboratories, Inc., Okayama, both of Japan

[21] Appl. No.: 692,503

[22] Filed: Jun. 3, 1976

[30] Foreign Application Priority Data

Jun. 20, 1975 [JP] Japan .................................. 50-76265

[51] Int. Cl.$^2$ .......................... C08L 3/00; C08L 3/02; C08L 5/02
[52] U.S. Cl. .................................. 106/162; 106/205; 106/213
[58] Field of Search ............... 106/213, 204, 162, 205; 260/9

[56] References Cited

U.S. PATENT DOCUMENTS

| | | | |
|---|---|---|---|
| 3,145,116 | 8/1964 | Zienty | 106/213 |
| 3,932,192 | 1/1976 | Nakashio | 106/204 |

*Primary Examiner*—Theodore Morris
*Attorney, Agent, or Firm*—Stevens, Davis, Miller & Mosher

[57] ABSTRACT

A method for improving the water-resistance of pullulan, which is a linear high polymer having the following structural formula:

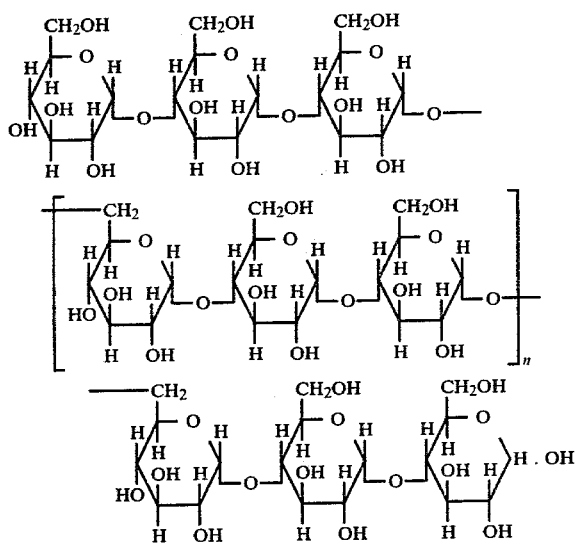

and useful as films, sheets, fibers and the like.

20 Claims, No Drawings

METHOD FOR IMPROVING WATER-RESISTANCE OF PULLULAN

The present invention relates to a method for improving the water-resistance of pullulan.

More particularly, this invention pertains to the manufacture of pullulan products having a high resistance against water and humidity as well as an improved solubility characteristics in water, which can be obtained from a new pullulan composition containing pullulan and dialdehyde polysaccharides.

Pullulan, which is a linear high polymer representable by the following structural formula:

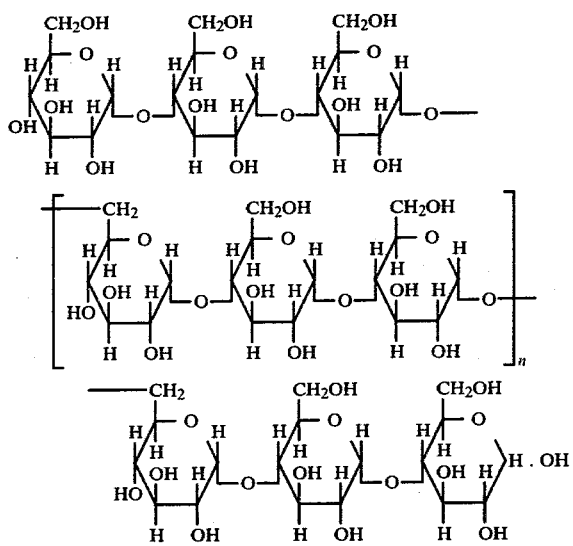

wherein n is an integer indicating the polymerization degree, has recently been proved to have various useful properties and be usable for many purposes. For example, pullulan is easily soluble in cold or hot water and forms an aqueous solution which has a very low viscosity and is very stable without gelation or retrograde on a long-term standing. Pullulan also has an excellent film-forming ability and the resulting film is superior in transparency, hardness and strength, and has a very low permeability to gases such as oxygen and nitrogen. Further, pullulan is non-toxic and is decomposed spontaneously in soil or water.

Thus, the pullulan is usable as films, sheets, fibers, binders, adhesives, paper-converting agents, and the like.

However, the application of pullulan is limited to areas where a high resistance against water or humidity is not required because the solubility of pullulan in water is too high and hence the products made of pullulan are not resistant to water or humidity and are liable to become tacky in a humid atmosphere.

As the result of a study, it has been found that the water-resistance of pullulan can be improved without loss of the excellent properties of pullulan by the addition of dialdehyde polysaccharides to pullulan.

An object of the present invention is therefore to provide a method for improving the water-resistance of pullulan and pullulan products which comprises adding dialdehyde polysaccharides to pullulan.

Another object of the present invention is to provide a pullulan composition which comprises pullulan and dialdehyde polysaccharides.

A further object of the present invention is to provide pullulan products having high resistance to water, which are prepared by admixing pullulan and dialdehyde polysaccharides with water, and drying the mixture to give the pullulan products.

Other objects and merits will be apparent from the foregoing and subsequent descriptions.

According to this invention, the pullulan products having an improved resistance to water as well as improved solubility characteristics are prepared by mixing pullulan and one or more dialdehyde polysaccharides with water and drying the mixture after or while shaping it if desired.

As disclosed in the U.S. Pat. No. 3,936,347, pullulan is prepared by the biosynthetic process using a strain belonging to the genus Pullularia, and the physical properties of pullulan vary somewhat depending on the strain used. In the present invention, however, pullulan obtained from any strain may be used. Further, as the pullulan used in the present invention, there may also be used pullulan derivatives which are substituted with various substituents, so long as the derivatives are soluble in water.

The molecular weight of the pullulan used in the present invention is not particularly limited, but an average molecular weight of $1.0 \times 10^4$ to $2.0 \times 10^6$ is preferred.

The dialdehyde polysaccharide used in this invention is one which is obtained by oxidation of polysaccharides with aqueous periodic acid or sodium periodate, and contains some dialdehyde parts of the following formula in its molecule.

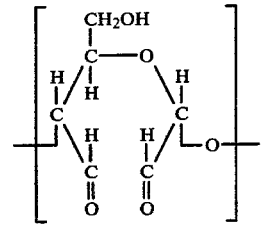

The polysaccharides may be, for example, starches (e.g. wheat starch and potato starch), celluloses, dextran, dextrin, pullulan and the like. The oxidation degree is not particularly limited if the resulting dialdehyde polysaccharides are soluble in cold or hot water. However, a desirable dialdehyde polysaccharide is obtained when 50–90% of the glucose units in the molecular are oxidized into the dialdehyde as above, particularly in the case of starches.

As to the mixing ratio of the dialdehyde polysaccharide to pullulan, 0.5–50:100 by weight is generally employed, but 1–30:100 by weight is preferable from the practical point of view.

The thus obtained mixture of pullulan and dialdehyde polysaccharides is then mixed with water so as to become uniform.

Generally, 1 to 20 times by weight of water is conveniently added to the mixture.

In this invention, various compounds may be added in order to accelerate the process wherein pullulan is made water-proof.

As the accelerating agents, there may be exemplified mineral acids such as sulfuric acid, hydrochloric acid and phosphoric acid; organic acids such as p-toluenesulfonic acid, β-naphthalene sulfonic acid and acetic acid; chlorides such as magnesium chloride and zinc chloride; and alkali metal hydroxides such as sodium hydroxide and potassium hydroxide. The preferred compounds among the agents are those which make acidic the aqueous solutions containing pullulan and dialdehyde polysaccharides. For this purpose, any of the acidic substances may be used, but addition of a large amount of the strong acids brings about the danger of acid decomposition of pullulan molecules. Consequently, it is desirable in general to select the kind and amount of the acidic substances so that the aqueous solutions have a pH of 4 to 6.

The pullulan products having a high transparency and an improved water-resistance are obtained from the thus obtained aqueous solutions containing pullulan and dialdehyde polysaccharides by, for example, drying the solutions at room temperature (about 20° C.) or elevated temperatures (up to 130° C.).

The water-solubility of the pullulan products may optionally be varied from insoluble in hot water to highly soluble in cold water by changing the mixing ratio of the dialdehyde polysaccharides to pullulan and/or the drying conditions. When the mixing ratio of dialdehyde polysaccharides to pullulan is increased and/or the drying temperature is raised, the water-solubility of the pullulan products generally decreases. However, it is also possible to obtain a pullulan product which is soluble in hot water but not in cold water and this will provide a new application for pullulan.

The pullulan products provided by this invention may be, for example, films, sheets, fibers, adhesives, paper-converting agents, binders. In preparing such products, additives such as colorants, plasticizers, and antioxidants may be added, if necessary.

The present invention will be illustrated in more details with reference to the following examples, which are only given for the purpose of illustration and not to be interpreted as limiting the invention thereto.

All the parts used in the examples are parts by weight unless otherwise instructed.

EXAMPLE 1

100 parts of each mixture comprising pullulan having an average molecular weight of 150,000 and dialdehyde starch (Karudasu ® No. 5, produced by Nihon Kāritto Co., Ltd.) in a mixing ratio as set forth in Table 1, was dissolved in 500 parts of water at 90° C. to obtain a uniform solution. This solution was coated on a glass plate and dried at room temperature to obtain a film of 30μ in thickness.

Table 1 shows the tackiness of this film at a relative humidity of 90% and the rates of dissolution in water at 20° C. and 80° C.

Table 1

|  | Composition | | | Rate of dissolution | |
|---|---|---|---|---|---|
|  | Pullulan (parts) | Dialdehyde starch (parts) | Tackiness | 20° C. | 80° C. |
| Example | 95 | 5 | hardly observed | about 1 hour | 1 minute |
|  | 90 | 10 | not observed | 3 hours | 2 minutes |
|  | 70 | 30 | not observed | 8 hours | 3 minutes |
| Control | 100 | 0 | observed | less than 1 minute | less than 1 minute |

EXAMPLE 2

80 parts of pullulan having an average molecular weight of 350,000 and 20 parts of dialdehyde starch (Karudasu ® No. 5, produced by Nihon Kāritto Co., Ltd.) were dissolved in 500 parts of water at 90° C. One half of the resulting solution was adjusted to pH 4.8 with acetic acid. Both solutions were each coated on a glass plate and dried at 100° C. for 5 hours to obtain a film of 30μ in thickness. The results are shown in Table 2.

Table 2

|  | Composition | | pH of aqueous solution | Rate of dissolution of film* |
|---|---|---|---|---|
|  | Pullulan (parts) | Dialdehyde starch (parts) | | |
| Example | 80 | 20 | 6.7 | about 20 hours |
|  | 80 | 20 | 4.8** | insoluble |
| Control | 100 | 0 | 4.8** | within 1 minute |

*Test in 50° C.-water
**Adjusted with acetic acid

EXAMPLE 3

Pullulan having an average molecular weight of 600,000 was oxidized with periodic acid so that 75% of glucose units in its molecule were converted to dialdehyde units.

20 Parts of thus obtained dialdehyde pullulan and 80 parts of pullulan having an average molecular weight of 250,000 were dissolved in 500 parts of water. This solution was coated on a glass plate and dried at 100° C. for 5 hours to obtain a film of 30μ in thickness.

The film obtained as above showed neither tackiness on its surface in the atmosphere of 90% relative humidity nor solubility at 20° C. in water.

What is claimed is:

1. A composition which comprises pullulan and one or more dialdehyde polysacchrides soluble in water.

2. A composition according to claim 1, wherein the mixing ratio of the dialdehyde polysaccharide to pullulan is 0.5 to 50:100 by weight.

3. A composition according to claim 2, wherein the dialdehyde polysaccharide is a polysaccharide of which glucose units in the molecule are oxidized to a dialdehyde of the following formula:

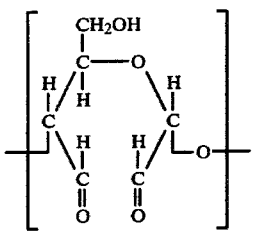

to such an oxidation degree that the resulting dialdehyde polysaccharide is soluble in hot or cold water.

4. A composition according to claim 1, wherein the molecular weight of the pullulan is from $1.0 \times 10^4$ to $2.0 \times 10^6$.

5. A composition according to claim 3, wherein the dialdehyde polysaccharide is one prepared from starch, cellulose, dextran, dextrin, or pullulan.

6. A composition according to claim 5, wherein the dialdehyde polysaccharide is one prepared from starch.

7. A composition according to claim 1, wherein the composition further contains acidic compounds.

8. A method for improving the solubility characteristics of pullulan in water which comprises adding one or more dialdehyde polysaccharides to pullulan.

9. A method according to claim 8, wherein the mixing ratio of the dialdehyde polysaccharide to pullulan is 0.5 to 50:100 by weight.

10. A method according to claim 8, wherein the dialdehyde polysaccharide is a polysaccharide of which glucose units in the molecule are oxidized to dialdehyde of the following formula:

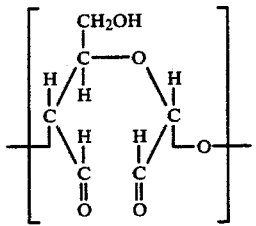

to such an oxidation degree that the resulting dialdehyde polysaccharide is soluble in hot or cold water.

11. A method according to claim 8, wherein the molecular weight of the pullulan is from $1.0 \times 10^4$ to $2.0 \times 10^6$.

12. A method according to claim 10, wherein the dialdehyde polysaccharide is one prepared from starch, cellulose, dextran, dextrin, or pullulan.

13. A method according to claim 12, wherein the dialdehyde polysaccharide is one prepared from starch.

14. A process for manufacturing pullulan products having an improved water-resistance and water-solubility characteristics which comprises mixing pullulan, one or more dialdehyde polysaccharides and water, and then drying the mixture.

15. A process according to claim 14, wherein the mixing ratio of the dialdehyde polysaccharide to pullulan is 0.5 to 50:100 by weight.

16. A process according to claim 15, wherein the dialdehyde polysaccharide is a polysaccharide of which glucose units in the molecule are oxidized to dialdehyde of the following formula:

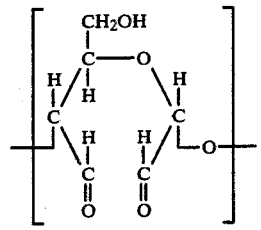

to such an oxidation degree that the resulting dialdehyde polysaccharide is soluble in hot or cold water.

17. A process according to claim 14, wherein the molecular weight of the pullulan is from $1.0 \times 10^4$ to $2.0 \times 10^6$.

18. A process according to claim 14, wherein the dialdehyde polysaccharide is one prepared from starch, cellulose, dextran, dextrin, or pullulan.

19. A process according to claim 14, wherein the dialdehyde polysaccharide is one prepared from starch.

20. A pullulan product having an improved water-resistance and water-solubility characteristic which is manufactured by the process of claim 14.

* * * * *